United States Patent [19]

Krasinski et al.

[11] Patent Number: 4,897,562
[45] Date of Patent: Jan. 30, 1990

[54] PROCESS AND APPARATUS FOR EFFICIENT SUM AND DIFFERENCE FREQUENCY GENERATION

[75] Inventors: J. S. Krasinski, Blairstown; Band, Y. B., Elizabeth; D. F. Heller, Boundbrook, all of N.J.

[73] Assignee: Allied-Signal Inc., Morris Township, Morris County, N.J.

[21] Appl. No.: 345,870

[22] Filed: May 1, 1989

[51] Int. Cl.⁴ .............................................. H03F 7/00
[52] U.S. Cl. .................................. 307/427; 372/21; 372/22
[58] Field of Search ........................... 372/21, 22, 29; 307/424, 425, 427

[56] References Cited

U.S. PATENT DOCUMENTS

| | | | |
|---|---|---|---|
| 3,530,301 | 9/1970 | Boyd et al. | 307/427 |
| 3,619,637 | 11/1971 | Goto | 307/427 |
| 3,629,601 | 12/1971 | Firester | 307/425 |
| 3,629,602 | 12/1971 | Firester | 307/425 |
| 3,778,635 | 12/1973 | Giuliani | 307/425 |
| 3,792,287 | 2/1974 | Roland et al. | 307/427 |
| 3,947,688 | 3/1976 | Massey | 307/425 |
| 4,331,891 | 5/1982 | Rizzo | 307/427 |
| 4,763,019 | 8/1988 | Duguay et al. | 307/427 |
| 4,784,450 | 11/1988 | Jain et al. | 307/430 |

Primary Examiner—William L. Sikes
Assistant Examiner—B. R. R. Holloway
Attorney, Agent, or Firm—Gerhard H. Fuchs; Ernest D. Buff; Richard C. Stewart

[57] ABSTRACT

Output efficiency in optical parametric mixing of at least two source laser beams to produce new frequencies representing the sum or difference of the source beams—where at least one source beam has two or more longitudinal modes—is improved by employing two non-linear mixing media (preferably mixing crystals), recovering the unconverted light of the original frequencies from the first mixing medium, separating it into its spectral components, delaying one of the separated components with respect to the other, and combining the separated components in the second mixing medium for conversion into a further frequency-shifted product beam.

8 Claims, 2 Drawing Sheets

PROCESS AND APPARATUS FOR EFFICIENT SUM AND DIFFERENCE FREQUENCY GENERATION

BACKGROUND OF THE INVENTION

This invention relates to the field of non-linear laser optics generally, and specifically to the field of non-linear optical parametric mixing of laser beams of different frequency in non-linear mixing media to generate beams of new frequencies.

The traditional method for generating light at a frequency equal to the sum ($\omega_1 + \omega_2$) or the difference ($\omega_1 - \omega_2$) of the frequencies $\omega_1$ and $\omega_2$ of two available laser light sources is non-linear optical parametric mixing (OPM). Beams of frequencies $\omega_1$ and $\omega_2$ are combined in a material, usually a crystal, having non-linear susceptibility to produce an output beam having frequency equal to the sum or difference of the frequencies of the input beams. For input beams having a single longitudinal mode, the efficiency of OPM can be comparable to the efficiency for second harmonic generation in a non-linear mixing crystal, provided that the input beams are spatially and temporally well overlapped. This, however, is rarely the case. Usually, two or more longitudinal modes are present in at least one of the input beams, so that the beams are no longer temporally correlated and, as the result of intensity fluctuations in each of the beams (due to mode beating), output efficiency is substantially reduced.

It is an object of the present invention to improve the output efficiency of OPM sum or difference frequency generation from laser beams having two or more longitudinal modes.

SUMMARY OF THE INVENTION

In accordance with the present invention, there is provided a method for efficient sum and difference frequency laser light beam generation by non-linear optical parametric mixing of laser beams of different central frequencies $\omega_1$ and $\omega_2$, at least one of which has two or more longitudinal modes, which involves: (a) generating two laser beams of different central frequencies $\omega_1$ and $\omega_2$, at least one of which has two or more longitudinal modes; (b) combining these beams in a non-linear mixing medium to thereby convert portions thereof into light of new central frequency $\omega_1 + \omega_2$ or $\omega_1 - \omega_2$, to obtain a mixed light beam comprising light of central frequencies $\omega_1$, $\omega_2$ and the new central frequency $\omega_1 + \omega_2$ or $\omega_1 - \omega_2$; (c) separating this light beam comprising light of central frequencies $\omega_1$, $\omega_2$ and $\omega_1 + \omega_2$ or $\omega_1 - \omega_2$ into spectral components comprising a first beam of central frequency $\omega_1 + \omega_2$ or $\omega_1 - \omega_2$, and a second beam combining the central frequencies $\omega_1$ and $\omega_2$; (d) separating the second beam into a third beam comprising light of the central frequency $\omega_1$ and a fourth beam of central frequency $\omega_2$; (e) delaying one of the beams generated in step (d) with respect to the other, to thereby shift the relative intensity modulation wave form by half its modulation period; and (f) combining the third and fourth beams in a nonlinear mixing medium to generate a further light beam of central frequency $\omega_1 + \omega_2$ or $\omega_1 - \omega_2$. Functionally, steps (b) and (c) may be carried out in a single operation, e.g., by employing a dispersion prism.

Optionally, the beams generated in steps (b) and (f), above, may be combined. The method of the present invention further involve the additional steps of orthogonalizing the polarization direction of the $\omega_1 + \omega_2$ or $\omega_1 - \omega_2$ light beams generated in steps (b) and (f), and combining the orthogonally polarized $\omega_1 + \omega_2$ or $\omega_1 - \omega_2$ beams.

The present invention further provides apparatus for efficient sum and difference frequency laser light beam generation by non-linear optical parametric mixing of laser beams of different central frequencies $\omega_1$ and $\omega_2$, at least one of which has two or more longitudinal modes, which comprises, in combination: (a) a first non-linear mixing medium to receive these laser beams of different central frequency and to convert portions of these beams into light of new frequency $\omega_1 + \omega_2$ or $\omega_1 - \omega_2$, to thereby generate a mixed light beam comprising light of central frequencies $\omega_1$, $\omega_2$ and $\omega_1 + \omega_2$ or $\omega_1 - \omega_2$; (b) means for separating the mixed light beam exiting from the first mixing crystal into its spectral components $\omega_1$, $\omega_2$ and $\omega_1 + \omega_2$ or $\omega_1 - \omega_2$; (c) delay means for shifting the relative intensity modulation wave form of the separated $\omega_1$ and $\omega_2$ beams with respect to each other to temporally correlate the largely undepleted modulation peaks of these beams; and (d) a second non-linear mixing medium to receive the $\omega_1$ and $\omega_2$ beams having temporally correlated largely undepleted modulation peaks, to convert them into light of central frequency $\omega_1 + \omega_2$ or $\omega_1 - \omega_2$.

Optionally, the apparatus may further include means for orthogonalizing the polarization directions of the light beams of central frequency $\omega_1 + \omega_2$ $\omega_1 - \omega_2$ which are generated in the first and second mixing media, and means for combining the polarization-matched beams of central frequency $\omega_1 + \omega_2$ or $\omega_1 - \omega_2$.

BRIEF DESCRIPTION OF THE DRAWINGS

The present invention may be better understood with reference to the annexed drawings, wherein.

DETAILED DESCRIPTION OF THE INVENTION

The following description further details the present invention, sets forth its preferred embodiments, and describes the best mode for its practice presently contemplated by us.

For purposes of the present invention, "mixing media" include any and all materials capable of second harmonic generation (or sum and difference frequency generation) when subjected to incident laser beams. These materials are well known to those skilled in the art and include, for example, non-linear crystals such as the dihydrogen phosphates of ammonium, potassium and rubidium; the dihydrogen arsenates of rubidium and cesium; lithium iodate; lithium niobate; potassium dideuterium phosphate; cesium dideuterium arsenate; barium sodium niobate; and others. The mixing medium may herein also be referred to as "mixing crystal".

Reference to "frequency" in the specification and claims is intended to be reference to "central frequency". It should be recognized that laser beams, though considered to be monochromatic, nevertheless have a certain frequency distribution about a central frequency.

The OPM conversion efficiency for a thin layer of mixing crystal is proportional to the time averaged second order cross-correlation function of the two input beams, $<g^{(2)}>t$. For input beams each containing two longitudinal modes, for example, $<g^{(2)}>t$ becomes $\frac{1}{2}$. This reduction of cross-correlation (conversion efficiency) does not occur for second harmonic generation in a mixing crystal (OPM with two identical beams), since the intensity fluctuations are identical in "both" beams and the second order time (auto-)correlation function, $<g^{(2)}>t$, is greater than unity for multimode beams. We have now discovered that this reduction in conversion efficiency in the sum and difference frequency laser light beam generation by non-linear optical parametric mixing of laser beams of different central frequencies $\omega_1$ and $\omega_2$, at least one of which has two or more longitudinal modes, can be avoided, or at least substantially mitigated, by employing two non-linear mixing crystals separated by a delay line for one of the two input frequency laser beams.

Figure 1:
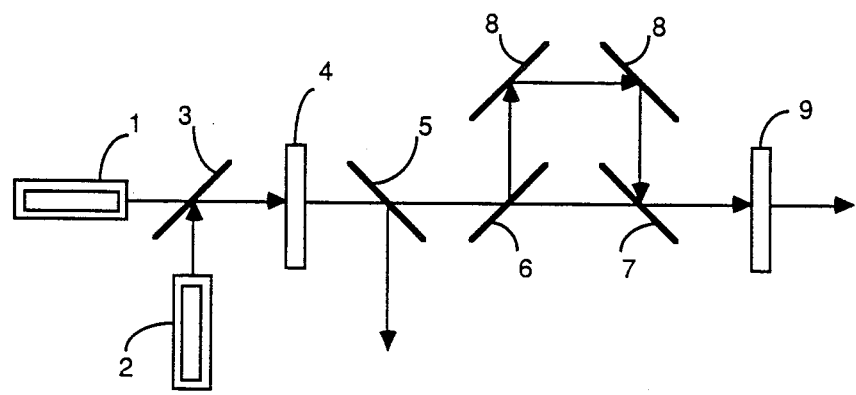
FIG. 1 is a schematic diagram of apparatus for the practice of the present invention, generating two beams of central frequency $\omega_1 + \omega_2$ or $\omega_1 - \omega_2$.

Apparatus for accomplishing this is described with reference to FIG. 1 of the drawings. A first laser beam of frequency $\omega_1$ which is generated by first laser (1), and a second laser beam of frequency $\omega_2$ which is generated by second laser (2), are combined into into a single codirectional beam by means of a suitable device such as, for example, dichroic mirror (3). At least one of these beams has two or more longitudinal modes. The combined beam is injected into first mixing crystal (4), wherein it is mixed by a Type I or a Type II phase matched process to respectively generate a new frequency representing the sum ($\omega_1+\omega_2$) or the difference ($\omega_1-\omega_2$) of the frequencies of the incident laser beams. Due to intensity fluctuations resulting from presence of several longitudinal modes in at least one of the input beams, conversion efficiency is reduced, so that the beam exiting the first mixing crystal (4) will contain light of the unconverted frequencies $\omega_1$ and $\omega_2$ in addition to the newly generated frequency $\omega_1+\omega_2$ or $\omega_1-\omega_2$. This beam of mixed frequencies is separated by means of dichroic mirror (5) into spectral components comprising a first product beam containing light of frequency $\omega_1+\omega_2$ or $\omega_1-\omega_2$, which is the desired output component; and a beam containing mixed $\omega_1$ and $\omega_2$, the unconverted components. The beam containing the unconverted components is further separated into its spectral components $\omega_1$ and $\omega_2$ by means of dichroic mirror (6). The separated $\omega_2$ component is then passed through an optical delay line defined by a pair of mirrors (8) in conjuction with dichroic mirrors (6) and (7), wherein it is delayed by the time element L/c, wherein L is the length of its oscillator cavity. This time delay shifts the intensity modulation waveform of one beam with respect to the other, assuring an increased value of the second order correlation function of the beams, thereby increasing the OPM conversion efficiency in the following mixing crystal (9).

Beam $\omega_1$ from dichroic mirror (6) and beam $\omega_2$ from the optical delay line are combined by means of mirror (7). The combined beams are then injected into second mixing crystal (9), wherein they are mixed by a Type I or a Type II phase matched process to respectively generate a new frequency representing the sum ($\omega_1+\omega_2$) or the difference ($\omega_1-\omega_2$) of the incident unconverted mixed beam. This is the second product beam containing the desired output frequency.

In essence, in the above-describe method and apparatus, the unconverted light of the original frequencies, which might normally go to waste, is recovered from the product beam of a first mixing crystal, for subsequent conversion in a second mixing crystal into a frequency-shifted product beam.

Figure 2:
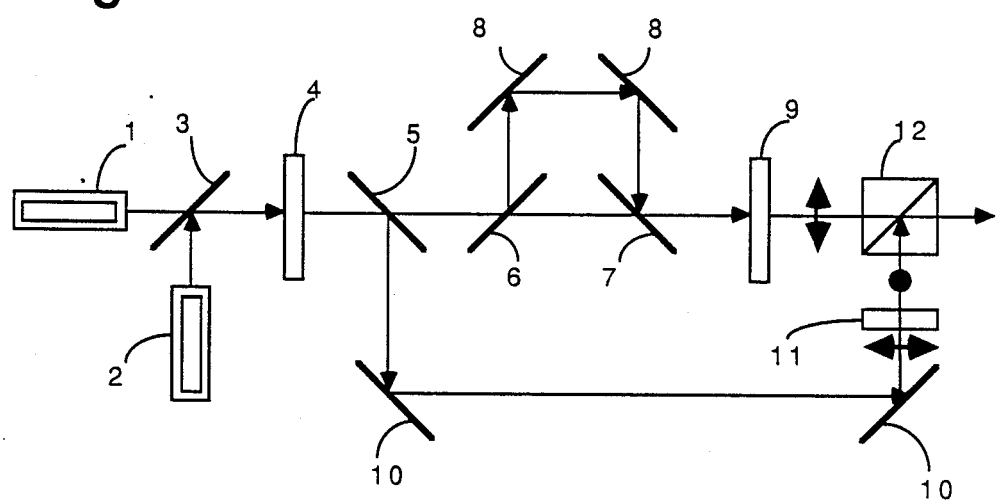
FIG. 2 is a schematic diagram of apparatus for the practice of the present invention as shown in FIG. 1, further including means for orthogonalizing the polarization direction of the $\omega_1 + \omega_2$ or $\omega_1 - \omega_2$ beams, and for combining the orthogonalized beams.

The two separate first and second product beams generated by the first and second mixing crystals, representing the sum ($\omega_1+\omega_2$) or the difference ($\omega_1-\omega_2$) of the incident fundamental beams, can conveniently be combined, as is illustrated in FIG. 2. However, since the first and second product beams are polarized, and since their plane of polarization may not be the same, the polarization of one may need to be be shifted. This can be accomplished, for example, by passing the first product beam from dichroic mirror (5) via mirrors (10) through means for shifting its plane of polarization (11), as for example a half-wave plate. The polarization-shifted first product beam and the second product beam can thereafter be conveniently combined, as by means of a polarization coupler (12). For illustrative purposes, the direction of polarization of the product beams is indicated in FIG. 2. The polarization direction of the first product beam before shifting is indicated by the double arrow and the blackend circle between mirror (10) and half-wave plate (11); and after shifting by the dark circle between half-wave plate (11) and polarization coupler (12). Polarization direction of the second product beam is indicated by the double arrow between second mixing crystal (9) and polarization coupler (12).

Figure 3:
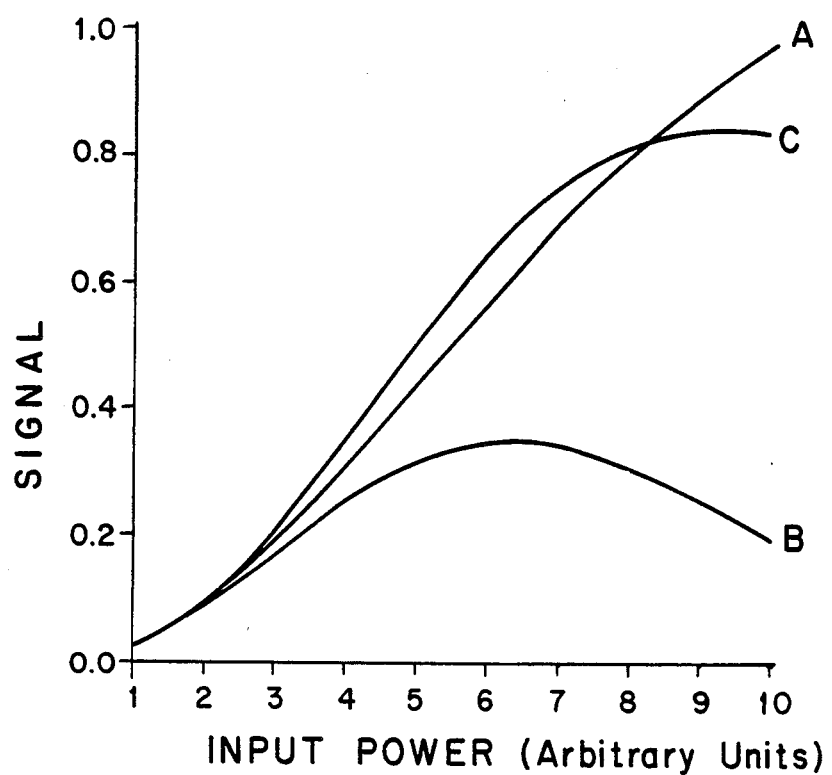
FIG. 3 is a graph showing the normalized output intensity vs. OPM nonlinear conversion coefficient resulting from utilization of the present invention.

FIG. 3 represents computer simulations of the OPM efficiency for the first mixing crystal (curve A), the second mixing crystal without time delay (curve B), and the second crystal with time delay (curve C). All curves were obtained for the same average power intensity in the crystal (the average is taken over the Poincaré period of the field). FIG. 3 is for input fields having two longitudinal modes of equal amplitude. Clearly, the sum frequency generating efficiency of the second crystal is greatly increased by introducing the time delay, and even exceeds the efficiency of the first crystal, resulting in much improved sum frequency generating efficiency. Improved efficiency is also obtained for laser beams having more than two modes, but with less pronounced improvement.

Since various changes may be made in the invention without departing from its spirit and essential characteristics, it is intended that all matter contained in the description shall be interpreted as illustrative only and not in a limiting sense, the scope of the invention bein defined by the appended claims.

We claim:

1. The method of sum and difference frequency laser light beam generation by non-linear optical parametric mixing of laser beams of different central frequencies $\omega_1$ and $\omega_2$, at least one of said beams having longitudinal modes, which comprises, in combination:
   (a) generating two laser beams of different central frequencies $\omega_1$ and $\omega_2$;
   (b) combining said beams in a non-linear mixing medium to thereby convert portions thereof into light of new central frequency $\omega_1+\omega_2$ or $\omega_1-\omega_2$, to generate a mixed light beam comprising light of central frequency $\omega_1$, $\omega_2$ and said new central frequency $\omega_1+\omega_2$ or $\omega_1-\omega_2$;

(c) separating said beam comprising light of central frequencies $\omega_1$, $\omega_2$ and $\omega_1+\omega_2$ or $\omega_1-\omega_2$ into spectral components comprising a first beam of central frequency $\omega_1+\omega_2$ or $\omega_1-\omega_2$, and a second beam combining the central frequencies $\omega_1$ and $\omega_2$;

(d) separating said second beam into a third beam comprising light of central frequency $\omega_1$ and a fourth beam of central frequency $\omega_2$;

(e) delaying one of said beams generated in step (d) with respect to the other, to thereby shift the relative intensity modulation wave form by half its modulation period; and (f) combining said third and fourth beams in a non-linear mixing crystal to generate a further light beam of central frequency $\omega_1+\omega_2$ or $\omega_1-\omega_2$.

2. The method of claim 1 further comprising the steps of orthogonalizing the polarization direction of the $\omega_1+\omega_2$ or $\omega_1-\omega_2$ light beams generated in steps (b) and (f), and combining the orthogonalized $\omega_1+\omega_2$ or $\omega_1-\omega_2$ beams.

3. The method of claim 2 wherein said first mentioned laser beams of central frequencies $\omega_1$ and $\omega_2$ are combined to generate light of a new central frequency $\omega_1+\omega_2$.

4. The method of claim 3 wherein both of said first mentioned laser beams have two or more longitudinal modes.

5. The method of claim 2 wherein said first mentioned laser beams of central frequencies $\omega_1$ and $\omega_2$ are combined to generate light of a new central frequency $\omega_1-\omega_2$.

6. Apparatus for sum and difference light beam generation by non-linear optical parametric mixing of laser beams of different central frequencies $\omega_1$ and $\omega_2$, at least one of said beams having two or more longitudinal modes, comprising, in combination:

(a) a first non-linear mixing medium to receive said laser beams of different central frequency and to convert portions of said beams into light of new frequency $\omega_1+\omega_2$ or $\omega_1-\omega_2$, to thereby generate a mixed light beam comprising light of central frequencies $\omega_1$, $\omega_2$ and $\omega_1+\omega_2$ or $\omega_1-\omega_2$;

(b) means for separating said mixed light beam exiting from said first mixing medium into its spectral components $\omega_1$, $\omega_2$ and $\omega_1+\omega_2$ or $\omega_1-\omega_2$;

(c) delay means for shifting the relative intensity modulation wave form of said separated $\omega_1$ and $\omega_2$ beams with respect to each other to temporally correlate the modulation peaks of said beams; and (d) a second non-linear mixing medium to receive said $\omega_1$ and $\omega_2$ beams having temporally correlated modulation peaks, to convert them into light of central frequency $\omega_1+\omega_2$ or $\omega_1-\omega_2$.

7. The apparatus of claim 6 further comprising means for orthogonalizing the polarization direction of the light beams of central frequency $\omega_1+\omega_2$ or $\omega_1-\omega_2$ which are generated in said first and second mixing media, and means for combining said orthogonalized beams of central frequency $\omega_1+\omega_2$ or $\omega_1-\omega_2$.

8. The apparatus of claims 6 or 7 wherein said first and second mixing media are non-linear mixing crystals.

* * * * *